Nov. 26, 1935.  H. HUEBER ET AL  2,022,642
SUCTION GENERATING SYSTEM
Filed July 24, 1931
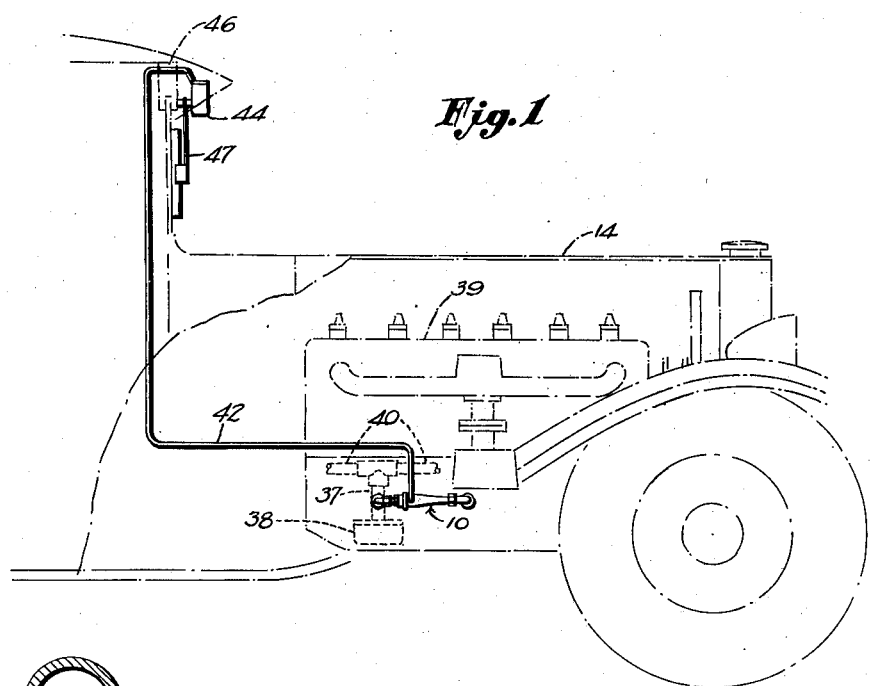
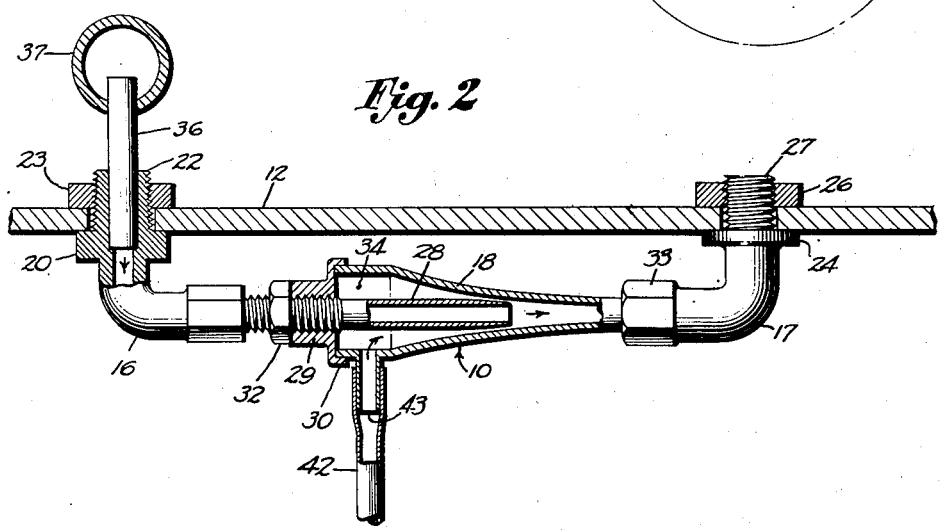
Inventors
Henry Hueber,
Erwin C. Horton,
By Bean, Brooks & Henry.
Attorneys Patented Nov. 26, 1935

2,022,642

UNITED STATES PATENT OFFICE 2,022,642

SUCTION GENERATING SYSTEM

Henry Hueber, Buffalo, and Erwin C. Horton, Hamburg, N. Y., assignors to Trico Products Corporation, Buffalo, N. Y.

Application July 24, 1931, Serial No. 553,019

8 Claims. (Cl. 60—60)

This invention relates to an automobile accessory system and in particular to a suction or vacuum producing device for operating motors of accessories, such as windshield cleaners.

It has been previously suggested to provide suction lines and suction motors operated from the suction side of the pistons of automobile engines for the purpose of operating windshield wipers. However, in this type of operation the suction is not always uniform because of the fact that the engine is operated at widely varying speeds. While additional apparatus have been devised which provide for substantially uniform operation of the windshield wiper, such apparatus are more or less expensive and it is of course desirable to maintain the cost of installing them at as low cost as possible.

According to this invention the suction producing device is provided for operating in conjunction with the liquid lubricant pump of the internal combustion engine to supply the windshield cleaner or other accessory with an efficient supply of low or negative pressure and at the same time avoid the impairment of the efficiency of the lubricating system.

For a better understanding of the invention reference may now be had to the accompanying drawing forming a part of this specification, of which Fig. 1 is a diagrammatic elevational view of an automobile and a device embodying the device installed thereon; and Fig. 2 is a view partially in cross-section and partially in plan illustrating the principal features of the invention.

According to the disclosure made by the drawing a relatively simple conduit construction is employed which is in the form of a branch extending from the main supply conduit communicating with the engine pump. This branch includes telescoping tubes, the outer one of which is tapered and they operate in a manner similar to the operation of a Venturi tube. Another conduit leads from the outer tapered tube to the windshield wiper motor and serves as a suction line to facilitate the operation thereof. The branch conduit discharges directly into the engine crank case and the lubricant so discharged is pumped again. Thus, by employing an arrangement of this kind the air which is drawn into the suction producing device is simply discharged with the lubricant into the crank case without being directed into the pump or through the lubricant supply conduit leading to the various portions of the motor vehicle to be lubricated.

In practicing the invention a suction producing device 10 is mounted upon a crank case wall 12 of a motor vehicle 14, and is shown as including outlet and inlet elbows 16 and 17, respectively, connected in fluid tight relation to a central tapered tubular housing 18. One end portion of the elbow 16 has an annular shoulder 20 that abuts one side of the crank case wall 12 and a threaded portion 22 extending through the wall which is provided with a clamping nut 23. Thus, the wall is clamped in fluid tight relation between the shoulder 20 and the nut 23. The other elbow 17 is provided with a similar shoulder 24 and clamping nut 26 for securing a threaded portion 27 firmly in fluid tight relation in the wall 12.

A relatively small tubular nozzle 28 integral with, and forming a part of, the elbow 16 extends into the larger end of the tapered tubular housing 18, and a nut 29 having a cupped flange 30 thereon seals the outer larger end of the housing about the nozzle. A suitable lock nut 32 prevents the sealing nut from being displaced. The other end of the tubular housing has a fluid tight connection 33 to the elbow 17. Thus, it will be observed, by viewing Fig. 2, that a space 34 defined between the nozzle and the inner surface of the tapered housing 18 tapers toward the end of the nozzle and at the latter location the end of the nozzle is spaced only a slight distance from the inner surface of the housing.

A pipe connection 36 secured in fluid tight relation into the threaded portion 22 of the elbow 16 is likewise secured to, and is in communication with, the interior of an outlet conduit 37 of a lubricant pump 38 that is suitably mounted inside the crank case wall 12 constituting a part of a conventional internal combustion engine 39 that serves to drive the motor vehicle. Branch conduits 40 supply lubricant to various parts of the motor vehicle from the pump in the crank case.

From this construction it will be apparent that the elements 36, 16, 18 and 17 constitute a bypass extending from the outlet conduit 37 of the pump back to the suction or inlet side of the pump through the crank case interior wherein the intermingled air is liberated from the lubricant for escape to the atmosphere through the usual breather opening thereof, while the airfreed oil is again ready to be pumped. Consequently, the crank case serves as an air-liberating chamber for the mixture returned by the discharging passage 17.

Another conduit 42 connected in fluid tight relation to a tubular nipple 43 extending integrally from the tapered housing is connected to a windshield wiper motor 44 mounted on the upper body portion 46 of the motor vehicle. This wiper motor is operated by suction, or by creating a partial vacuum therein, and is conventional in construction. Therefore, a specific description of it is not required for a thorough understanding of this device. A windshield wiper 47 is operated by the motor against the windshield glass and serves to keep the glass free from moisture and other foreign matter.

The windshield cleaner may be of that type disclosed in Patent No. 1,674,056 granted June 19, 1928 to John R. Oishei and Henry Hueber. Such fluid pressure operated windshield cleaner embodies an automatic valve mechanism for alternately shifting the pressure differential from one side of the piston to the other and thereby move the latter back and forth for reciprocating the wiper blade. The suction line is usually controlled by a manually operated valve, and therefore when used with the suction producer herein set forth, if the wiper is obstructed in its movement or the suction line is closed by the manual valve then the fluid in the suction producer will provide sufficient slippage to avoid placing the suction line or the windshield cleaner parts under abnormal strains or pressures. Therefore, while the piston of the automobile accessory is moved by the movement of the air column between the suction producer 10 and the accessory, such movement is under the influence of a yielding urge provided by the suction producer and as distinguished from the more positive action of a power driven pump.

In operating the device described lubricant is pumped, in the direction indicated by the arrows in Fig. 2, in an unbroken stream through the elbow 16, through the nozzle 28, through the smaller portion of the tapered housing 18, and through the elbow 17 back into the crank case. The flow of lubricant from the nozzle 28 creates suction or a partial vacuum in the space 34 and consequently in the tubular conduit 42, thereby providing adequate suction for operating the windshield wiping motor 44. Since the air which is drawn through the conduit 42 does not pass through the lubricant supply conduit 40, but only passes with the lubricant through the elbows 16 and 17 into the crank case, there can be no disadvantageous effect of a mixture of lubricant and air in the conduits 37 and 40 which might be transferred to the various portions of the vehicle to be lubricated. In fact there are two independent streams of lubricant, one through the pipes 37 and 40 for lubricating purposes, and one through the by-pass for creating suction in the tubular member 18.

From the foregoing description it will be apparent that the invention provides an efficient and simple device for creating suction, and at the same time prevents any dust or other foreign matter from being drawn into the lubricating system other than the crank case in which the lubricant is filtered as it is drawn into the pump. Thus, a pure stream of lubricant can be supplied, and at the same time, efficient operation of the windshield wiper is insured.

Although only one form of the invention has been shown and described in detail it will be apparent to those skilled in the art that the invention is not so limited but that various changes may be made therein without departing from the spirit of the invention or the scope of the appended claims.

What is claimed is:

1. A motor vehicle power plant having an oil containing reservoir open to the atmosphere, a lubricant pump having an inlet in communication with the reservoir, an outlet passage from the pump to various bearings in the power plant for lubricating the same, a branch conduit providing a direct communication between the outlet passage and the reservoir and through which a portion of the lubricant discharged from the pump is forced, and means interposed in the branch conduit for creating suction independently of the flow of lubricant passing to said various bearings, said means having a suction conduit for connection to a fluid operated device.

2. In combination with a force feed lubricating system of a motor vehicle power plant, a lubricant pump included in said system provided with an outlet passage through which lubricant is forced to various points of lubrication of the power plant, a lubricant reservoir serving as an air liberating space and connected to the inlet side of the pump, a branch conduit connecting to the outlet side of the pump to the lubricant reservoir for conducting a portion of the pump output back to the reservoir, an injector interposed in the branch conduit and having an induction chamber through which air is drawn into the lubricant passing through said conduit for subsequent liberation in the reservoir, and a suction conduit connected to the chamber and adapted for connection to the suction operated accessory.

3. In combination with a force feed lubricating system of a motor vehicle power plant, a lubricant pump included in said system provided with an outlet passage through which lubricant is forced to various points of lubrication of the power plant, a lubricant reservoir serving as an air liberating space and connected to the inlet side of the pump, a suction inducer interposed in the pump outlet and having an induction chamber through which air is drawn into the lubricant passing therethrough for subsequent liberation in the reservoir, and a suction conduit connected to the chamber and adapted for connection to a suction operated accessory.

4. The combination with a motor vehicle power plant having a force feed lubricating system in which is included a lubricant pump with an outlet passage leading to various points of lubrication in the power plant, of a suction inducer having a lubricant inlet connected into the pump outlet passage to divert a portion of the pump outflow through the suction inducer, said suction inducer having an air inlet and a discharge passage, said discharge passage being connected for delivering its flow into the crank case of the power plant, and said air inlet being adapted for connection to an accessory suction line.

5. In combination with a force feed lubricating system of a motor vehicle, having a pump for forcing the lubricant to the various points of lubrication of the motor vehicle engine, a lubricant discharging conduit connected to the outlet side of the pump for conducting a portion of the pumped lubricant away from the pump outlet, an air liberating container into which said conduit discharges, said air liberating container having a return feed connection communicating with the inlet side of the pump, and an injector interposed in the conduit in advance of the air liberating container and having an induction chamber provided with a lubricant inlet and an air inlet, air being drawn into the induction chamber through the air inlet and carried with the lubricant into the air liberation container for liberation therein prior to the flow of lubricant from said air liberating container into the inlet side of the pump, said air inlet of the induction chamber being provided for attachment to a suction line of an automotive accessory.

6. A power plant having an oil containing reservoir open to the atmosphere, a force feed oil system having a pump delivering oil from the reservoir through a pump outlet passage to lubricate bearings in the power plant, an air flow inducer having an oil inlet and an air inlet, a conduit branching from the pump outlet passage to the oil inlet of the inducer whereby a portion of the pump output is diverted through the inducer for inducing an air flow through the air inlet thereof, said inducer having an outlet directed into the reservoir for the return of the air laden oil thereto, and an accessory suction line connected to the air inlet of the air inducer.

7. The combination with an oil containing reservoir open to the atmosphere and a pump including an oil outlet for forcing oil from the reservoir to parts to be lubricated; a pipe connected to the outlet for receiving part of the oil forced from the pump, suction inducing means in said pipe energized by the flow of oil forced therethrough from the pump to induce suction, and a suction conduit connected to said suction inducing means and communicating with the atmosphere to provide a suction connection for a suction operated device, said pipe and suction inducing means communicating with the oil containing reservoir for returning to the reservoir the oil forced into said suction inducing means and liberating air drawn into the pipe through the suction inducing means.

8. The combination with an oil containing crank case of a motor vehicle power plant and a pump including an outlet conduit for forcing oil from the pump to various parts of the power plant to be lubricated, a by-pass communicating with the outlet conduit for receiving part of the oil forced through said conduit, said by-pass extending outside the crank case and back into the crank case, and suction inducing means in said by-pass outside the crank case responsive to the flow of oil therethrough to induce suction, and a suction conduit connected to said suction inducing means and communicating with the atmosphere to provide a suction connection for a suction operated device, said by-pass feeding back into the crank case for liberating air drawn therein whereby oil free of air is supplied to the inlet side of the pump.

HENRY HUEBER.
ERWIN C. HORTON.